(12) United States Patent
Cormier et al.

(10) Patent No.: US 10,916,873 B2
(45) Date of Patent: Feb. 9, 2021

(54) CONNECTION ASSEMBLY, FEMALE CONTACT, AND CONNECTION METHOD THEREOF

(71) Applicant: Aptiv Technologies Limited, St. Michael (BB)

(72) Inventors: Francois Cormier, Dammarie sur Loing (FR); Soizic Le Glouanec, St. Arnoult en Yvelines (FR); Sylvain Bossuyt, Boutigny Prouais (FR)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/658,210

(22) Filed: Oct. 21, 2019

(65) Prior Publication Data
US 2020/0136287 A1 Apr. 30, 2020

(30) Foreign Application Priority Data
Oct. 26, 2018 (FR) ...................... 18 59903

(51) Int. Cl.
*H01R 13/11* (2006.01)
*B60L 53/16* (2019.01)
(Continued)

(52) U.S. Cl.
CPC ............ *H01R 13/111* (2013.01); *B60L 53/16* (2019.02); *H01R 4/28* (2013.01); *H01R 13/03* (2013.01);
(Continued)

(58) Field of Classification Search
CPC .... H01R 13/03; H01R 13/052; H01R 13/111; H01R 13/115; H01R 13/20; H01R 4/28; H01R 24/20; B60L 53/16
See application file for complete search history.

(56) References Cited

U.S. PATENT DOCUMENTS 4,002,400 A * 1/1977 Evans ................. H01R 13/187
439/748
5,135,417 A 8/1992 Stanevich
(Continued)

FOREIGN PATENT DOCUMENTS

CN 204304026 U 4/2015
JP 2014154375 A 8/2014
(Continued)

OTHER PUBLICATIONS

European Search Report for European Application No. 19205187.8 dated Mar. 13, 2020.
(Continued)

*Primary Examiner* — Oscar C Jimenez
(74) *Attorney, Agent, or Firm* — Carlson, Gaskey & Olds, P.C.

(57) ABSTRACT

In a connection assembly comprising a male contact and a female contact, the female contact comprises a plurality of elastic blades extending longitudinally along a central axis parallel to a direction of insertion. Each of these blades comprises two bent contact zones to form, respectively, a first and a second contact surfaces that are convex and essentially oriented towards the central axis on each of these bent zones. The first contact surface is situated closer than the second contact surface to the free end of the blade on which they are formed.

19 Claims, 3 Drawing Sheets

(51) Int. Cl.
   *H01R 4/28* (2006.01)
   *H01R 13/03* (2006.01)
   *H01R 13/05* (2006.01)
   *H01R 13/115* (2006.01)
   *H01R 13/20* (2006.01)
   *H01R 24/20* (2011.01)

(52) U.S. Cl.
   CPC ......... *H01R 13/052* (2013.01); *H01R 13/115* (2013.01); *H01R 13/20* (2013.01); *H01R 24/20* (2013.01)

(56) References Cited

U.S. PATENT DOCUMENTS

| | | | | |
|---|---|---|---|---|
| 5,634,829 | A * | 6/1997 | Kerul | H01R 13/193 439/842 |
| 8,613,626 | B1 * | 12/2013 | Phan | H01R 13/11 439/181 |
| 9,680,247 | B1 | 6/2017 | Glick et al. | |
| 2012/0126845 | A1 * | 5/2012 | Oniyama | H01R 13/20 324/762.01 |
| 2015/0207242 | A1 * | 7/2015 | Sugiyama | H01R 4/489 439/856 |
| 2016/0197426 | A1 * | 7/2016 | Kawaguchi | H01R 13/03 439/877 |
| 2017/0302017 | A1 * | 10/2017 | Inoue | H01R 13/111 |
| 2018/0269619 | A1 * | 9/2018 | Beimdieck | H01R 31/06 |
| 2018/0316111 | A1 * | 11/2018 | Lubeley | H01R 13/111 |
| 2019/0135131 | A1 * | 5/2019 | Wenz | H01R 4/308 |
| 2020/0091645 | A1 * | 3/2020 | Tanaka | H01R 13/193 |

FOREIGN PATENT DOCUMENTS

| | | |
|---|---|---|
| KR | 101744471 B1 | 6/2017 |
| WO | 2007039250 A1 | 4/2007 |
| WO | 2017195013 A1 | 11/2017 |

OTHER PUBLICATIONS

First Office Action and Search Report for Chinese Application No. 201911021539.4 dated Oct. 22, 2020.

* cited by examiner

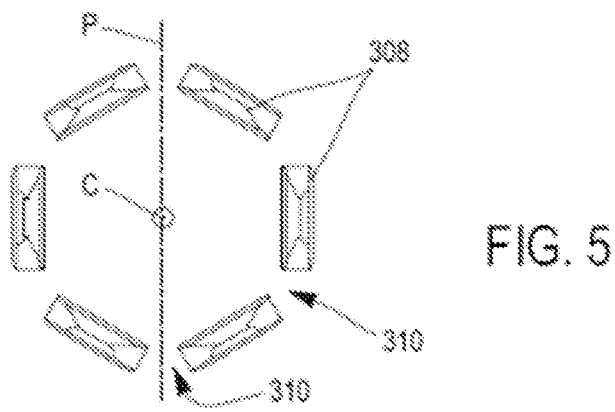
FIG. 5
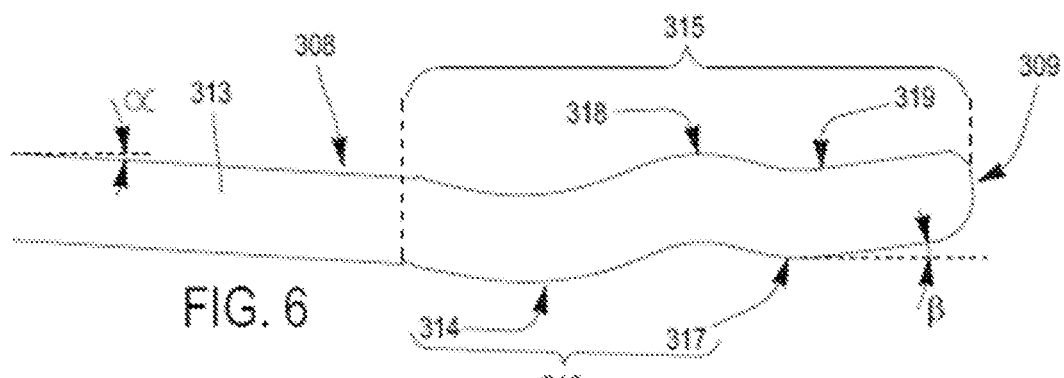
FIG. 6
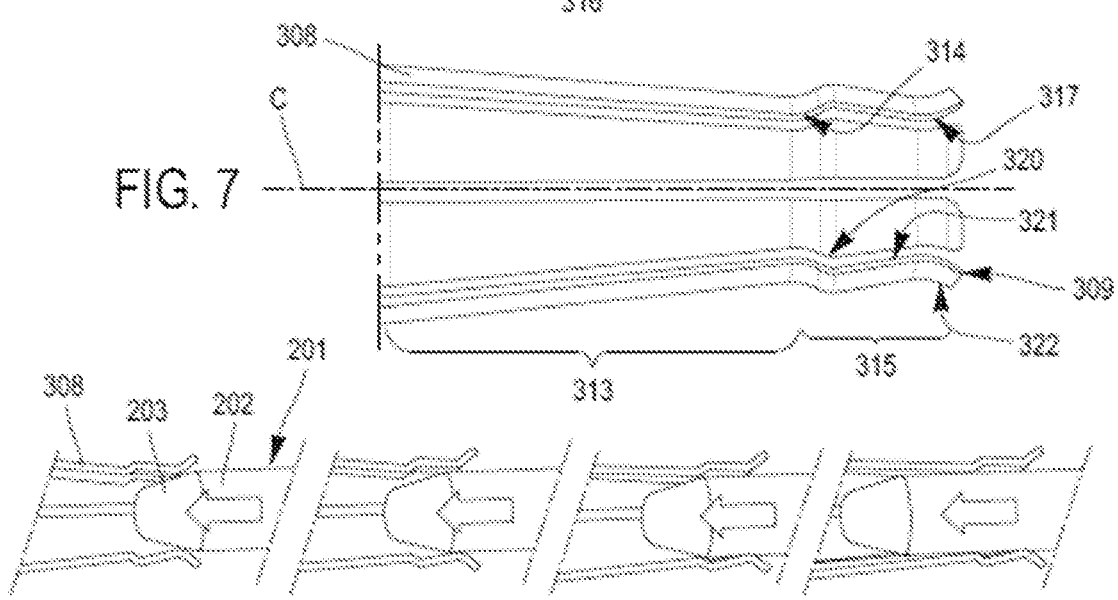
FIG. 7
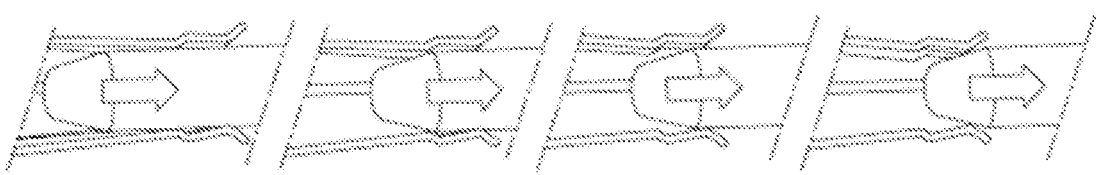
FIG. 8A   FIG. 8B   FIG. 8C   FIG. 8D
FIG. 9A   FIG. 9B   FIG. 9C   FIG. 9D

CONNECTION ASSEMBLY, FEMALE CONTACT, AND CONNECTION METHOD THEREOF

CROSS-REFERENCE TO RELATED APPLICATION

This application claims the benefit under 35 U.S.C. § 119(a) of Patent Application No. 1859903 filed in the Institut National de la Propriété Industrielle (French Patent Office) on Oct. 26, 2018, the entire disclosure of which is hereby incorporated by reference.

TECHNICAL FIELD OF THE INVENTION

The invention relates to the field of power connection systems for motor vehicles, in particular those used to charge a rechargeable electric or hybrid-electric vehicle battery.

BACKGROUND OF THE INVENTION

As represented schematically in FIG. 1, a rechargeable electric or hybrid vehicles 100 can comprise a connector socket 200 to which can be connected a charge plug 300 powered by an electric charging station 400, via a cable 500. This charge plug 300 then makes it possible to charge a battery located in the vehicle 100.

A charge plug 300 generally comprises power electrical contacts 301 for the charging of the vehicle and electrical contacts 302 intended to transmit an electrical signal, see for example the exploded view of the charge plug represented in FIG. 2B. The power electrical contacts 301 for the charging of the vehicle are female contacts. This electrical signal generally makes it possible to control the power supply of the charge plug 300, in particular during connection and disconnection phases, so as to cut the power supply before the charge plug 300 is itself fully disconnected. It can however happen that, in rare circumstances, a charge plug 300 is disconnected while it is powered. In such circumstances, an electrical arc can occur between the power contacts 301 of the charge plug 300 and the power contacts of the socket 200. It has been observed that such electrical arcing can damage, in particular, the power contacts 301 of the charge plug 300. It is then desirable to avoid having the contact quality at the power contacts 301 being degraded if the charge plug is disconnected while it is powered. For example, it is desirable to ensure a constant contact quality even if the charge plug 300 undergoes at least fifty live disconnections.

In the field of power connection systems for motor vehicles, the female contacts for the charge plugs are generally machined by bar turning from a bar of conductive material, for example a copper alloy. Such a female contact comprises a bushing comprising a plurality of elastic blades. Each elastic blade extends longitudinally, parallel to a central axis, between a base and a free end. The generation of an insertion force, of a contact force and of an electrical conduction suited to the application targeted is obtained in particular by the choice of the material and of the form of the blades (cross section, length, angle relative to the central axis, etc.). These blades are configured to receive the pin of a male contact between them when the latter is mated to the female contact. Each blade is thus configured to establish at least one electrical contact with the pin of the male contact.

The applicant is faced by a problem of designing and producing a female contact that can preserve contact quality, even if the charge plug undergoes at least fifty live disconnections.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

One aim of the invention is to provide a connector with a lever for facilitating the connection that is more compact than the connectors of the prior art.

The solution found consists in creating, on the female contacts, in the present case mounted in a charge plug, at least two contact zones: a sacrificial zone at which an electrical arc can occur and a useful contact zone which is preserved from any electrical arcing. More specifically, in order to ensure that no electrical arc can occur at a useful contact zone, each blade is provided with a sacrificial zone.

There is thus provided, a connection assembly comprising a male contact and a female contact. The male contact comprises a pin composed of an electrically conductive material. This pin extends longitudinally along a central axis parallel to a direction of insertion (during the coupling of the male contact with a female contact or when the latter are mated), between an end linked mechanically and electrically to a fixing portion, and a free end. The female contact comprises a bushing comprising a plurality of elastic blades. Each elastic blade extends longitudinally, between a base and a free end. In other words, each blade is linked to the rest of the contact only at the base. The blades are configured to receive the pin of the male contact between them and establish at least one electrical contact with the pin, when the male contact is mated to the female contact.

Furthermore, each of the blades comprises two bent contact zones so as to form, respectively, on each of these bent zones, a first and a second contact surfaces that are convex and essentially oriented towards the central axis, the first contact surface being situated closer than the second contact surface to the free end of the blade on which they are formed. In other words, the first contact surface corresponds to a sacrificial zone and the second contact surface corresponds to a useful contact zone.

Furthermore, the pin is provided, at its free end, with a cap composed of a dielectric material. The first contact surface of each blade is then conformed so that, upon connection of the male contact and of the female contact, the first contact surface rests on the cap before establishing an electrical contact with an electrically conductive zone of the pin.

This connection assembly possibly comprises one or other of the following features, considered independently of one another or in combination with one or more others:
  upon the introduction of the male contact between the blades, the first and second contact surfaces rest in succession on the outer surface of the cap, inclined relative to the direction of insertion;
  the bushing is formed by cutting and stamping of an electrically conductive material in sheet form;
  each of the two contact zones is conformed so that, upon the disconnection of the male contact and of the female contact, there is a respective position of the male and female contacts in which the first contact surface is still in contact with the pin, while the second contact surface is no longer in contact with the pin and is located in line with the cap;

the pin and the cap have essentially a symmetry of revolution about the central axis;

the cap has an essentially tapered form, the height of which is located on the central axis, and the two contact surfaces of each blade are conformed so that, upon the disconnection of the male contact and of the female contact, the second contact surface rests temporarily on the cap while the first contact surface is still in contact with the pin;

the first contact surface of each blade is in contact with the pin when the male and female contacts are mated; alternatively, the first contact surface of each blade is not in contact with the pin when the male and female contacts are mated;

each blade comprises a section at right angles to the longitudinal direction, essentially rectangular, between the base and its free end;

each of the blades comprises a third bent zone, concave relative to the reception space, this third zone being situated between the first and second bent contact zones;

when the blades are not stressed and they are viewed from their second contact surface to the base, the blades form an acute angle with the direction of insertion;

when the blades are not stressed and they are viewed from their first contact surface to their free end, the blades form an acute angle with the direction of insertion;

the length of the cap parallel to the direction of insertion is greater than or equal to the distance between the first and second contact surfaces parallel to this same direction.

According to another aspect, the invention relates to a female contact for a connection assembly as mentioned above.

According to yet another aspect, the invention relates to a connection, disconnection and electrical power supply method for an assembly such as that mentioned above. This method comprises:

a power supply phase during which the male contact and the female contact are passed through by a current greater than or equal to 32 amperes while the second contact surfaces establish a physical and electrical contact with the pin, and the first contact surfaces are not in physical and electrical contact with the pin, and a phase of disconnection of the male and female contacts, in which at least one first contact surface remains in electrical contact with the pin, while each first contact surface is at a distance from any conductive zone of the pin of at least 1.5 millimeters.

BRIEF DESCRIPTION OF THE SEVERAL VIEWS OF THE DRAWING

The present invention will now be described, by way of example with reference to the accompanying drawings, in which:

FIG. 5 represents, schematically in cross section, the female contact of FIGS. 3 and 4;

FIG. 6 represents, schematically and in longitudinal cross section, a detail of the female contact of FIGS. 3 to 5;

FIG. 7 represents, schematically and in longitudinal cross section, the blades of a second embodiment of a female contact according to the invention;

FIGS. 8A to 8D represent, schematically, different phases of a connection method for a male contact and a female contact according to the second embodiment of a connection assembly according to the invention; and FIGS. 9A to 9D represent, schematically, different phases of a disconnection method for a male contact and a female contact according to the second embodiment of a connection assembly according to the invention.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
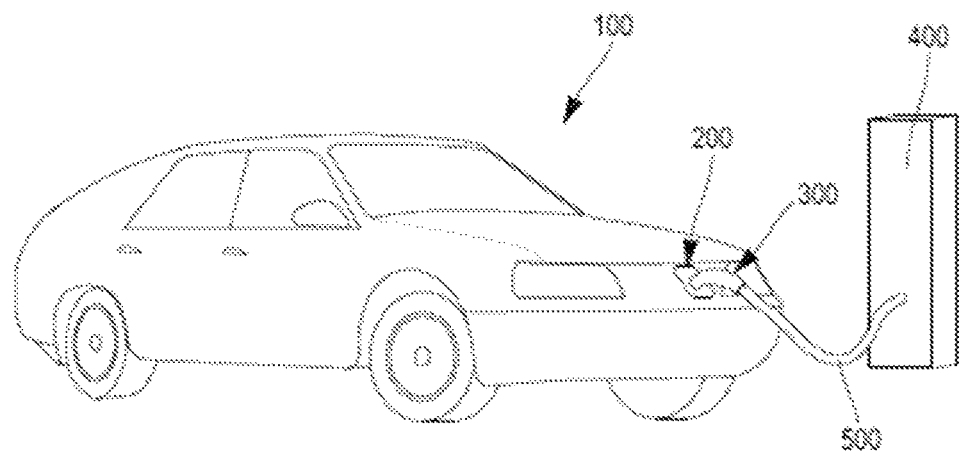
FIG. 1 represents, schematically and in perspective, a connection assembly according to the invention, with a socket mounted on a vehicle and a charge plug mounted on a cable and connected to the socket.

A non-limiting example of connection assembly according to the invention is represented in FIG. 1. This assembly comprises a connector socket 200 and a charge plug 300. Male power contacts 201 (not represented in FIG. 1) are mounted in cells of the connector socket 200. The male contacts 201 comprise a pin 202 composed of an electrically conductive material and extending longitudinally along a central axis C parallel to a direction of insertion, between an end linked mechanically and electrically to a fixing portion, and a free end. They are of a type known to the person skilled in the art. Power female contacts 301 are mounted in the charge plug 300.

Figure 2B:
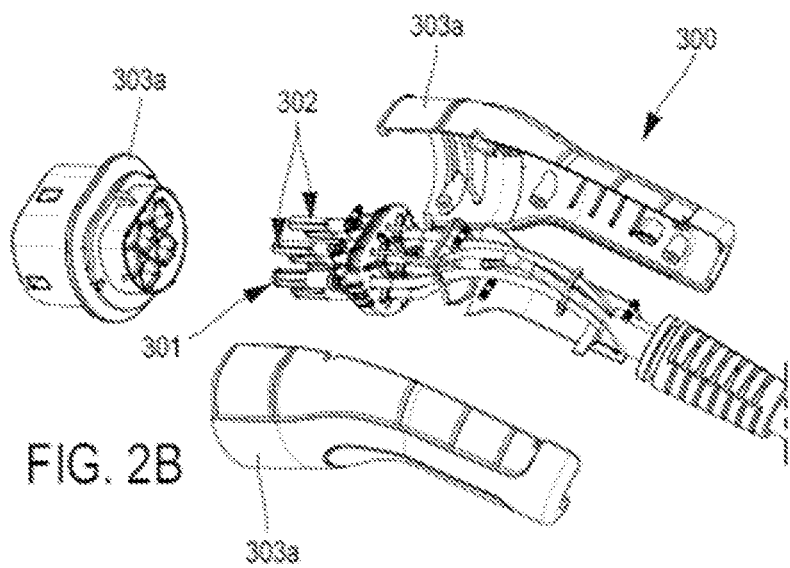
FIGS. 2A and 2B represent, in perspective and schematically in an exploded view, an example of charge plug such as that shown in FIG. 1.
Figures 3, 4:
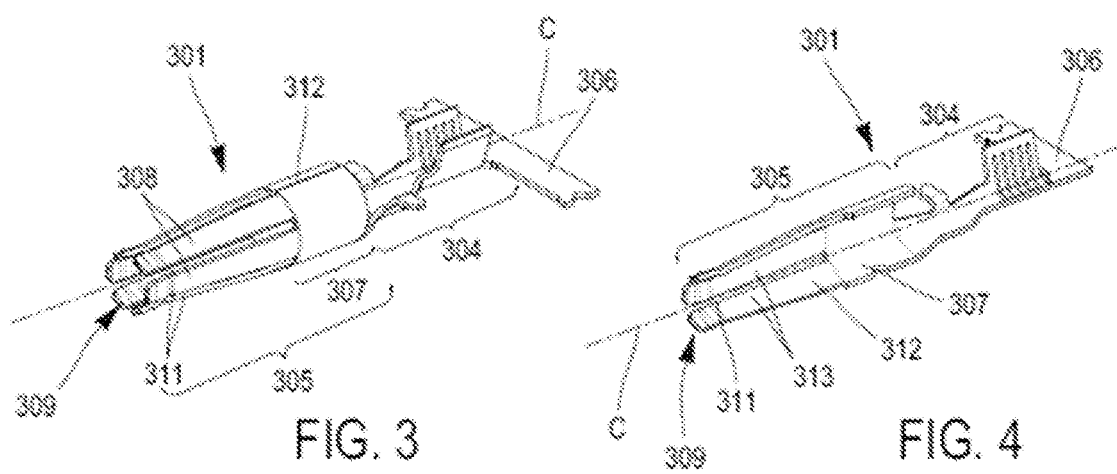
FIG. 3 represents, schematically and in perspective, a female contact according to a first embodiment of the invention.
FIG. 4 represents, schematically, in longitudinal cross section and in perspective, the female contact of FIG. 3.
Figure 2A:
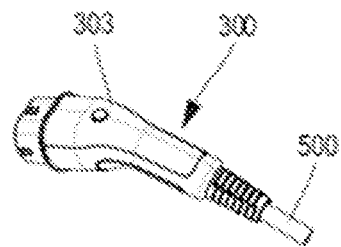

As represented in FIG. 2B, the charge plug 300 comprises a housing 303 (in the present case composed of several elements 303a) in which are housed, in a manner known to the person skilled in the art, female contacts 301. As represented in FIGS. 3 and 4, the female contacts 301 comprise a fixing portion 304 and a connection portion 305. The fixing portion 304 is intended to electrically and mechanically link the female contact 301 to an electrical wire. The connection portion 305 is intended to receive a pin 202 of a male contact 201.

The female contact 301 corresponding to the embodiment of FIGS. 3 to 6, is formed by cutting and stamping an electrically conductive material in sheet form. This material is composed for example of a copper alloy, in the form of a sheet whose thickness is between 0.3 and 1 millimeter, and is for example preferentially 0.6 millimeters.

This female contact 301 is designed to comply with the international standard IEC 62196. The latter defines the interface between the charge plug 300 and the connector socket 200, the geometry of the cavities in which the contacts must be housed and the points at which the electrical conduction must be established between the male and female contacts.

Thus, for example, the female contact 301 must make it possible to maintain a heating temperature lower than 50° C. when, mated with a male contact 201, it is passed through by an electrical current of 44 amperes. However, even if, for this purpose, a relatively thick sheet of electrically conductive material is used, the coupling effort between the female contact 301 and a male contact 201 must be less than 5 Newtons.

Furthermore, this female contact 301 must satisfy a wear test over at least 14 000 coupling/uncoupling cycles with a male contact 201 and 50 disconnections under load without it being possible to observe a heating greater than that indicated above.

To these constraints is added the fact that the male contacts 201 and female contacts 301 must comply with the IP2X standard, and possibly that the cost of production of the female contacts 301 be controlled, even reduced.

All this has been taken into account in designing the female contact 301 described hereinbelow.

The fixing portion 304 is designed to produce a fixing and connection by clamping with an electrical wire. In FIGS. 3 and 4, the fixing portion 304 is still linked to a support strip 306.

After cutting and shaping, the female contact 301 has a connection portion 305 in the form of an essentially cylindrical bushing. The bushing is formed by bending and rolling the sheet of cut electrically conductive material. The connection portion 305 is linked mechanically to the fixing portion 304. This bushing comprises a base 307 and a plurality of elastic blades 308. In the example represented, there are six of the elastic blades 308, distributed essentially symmetrically about a central axis C, parallel to a direction of insertion of a pin 202 of a male contact 201 into the bushing. Each elastic blade 308 extends longitudinally, between the base 307 and a free end 309. Each elastic blade 308 is linked to the rest of the contact only at the base 307. In other words, each blade 308 is separated from its nearest neighbours by a gap 310 which extends between the base 307 and the free end 309 of the blades 308 and which mechanically and electrically insulates them from one another. Between the base 307 and the free end 309 of the blades 308, the cross section of the blades 308 is essentially rectangular (see also FIG. 5).

The base 307 essentially has a straight circular cylindrical form. The longitudinal edges 311 of the cut-out at the base meet on a plane of symmetry P (cutting plane of FIG. 4, see also FIG. 5), passing also through two diametrically opposing gaps 310. The blades 308 are distributed symmetrically on either side of this plane of symmetry P (three blades 308 on each side of the plane).

As represented in FIG. 4, each elastic blade 308 comprises a first portion 312 situated in the extension of the base 307 and parallel to the generatrix of the cylinder of the base 307. For example, this first portion 312 has a length of between 3 and 10 millimeters, and is for example preferentially 5 millimeters.

Each elastic blade 308 also comprises a second portion 313 situated in the extension of the first portion 312 towards the free end 309. When it is not stressed, the second portion 313 forms, with the first portion 312 (that is to say also with the central axis C) an angle α of between 2 degrees and 15 degrees, and is for example preferentially 8 degrees. In other words, when the blades 308 are not stressed and they are viewed from their second contact surface 314 to the base 307, the blades form an acute angle α with the direction of insertion.

For example, this second portion 313 has a length of between 25 and 35 millimeters, and is for example preferentially 21 millimeters. The join between the first 312 and second 313 portions acts as hinge. In other words, when the pin 202 of a male contact 201 is inserted between the blades 308 of a female contact 301, the length of the second portion 313 is such that the second portion 313 forms a lever which is deformed essentially at the join between the first 312 and second 313 portions. This lever makes it possible to control the insert effort.

Each elastic blade 308 also comprises a third portion 315 situated in the extension of the second portion 313 towards the free end 309. The third portion 315 comprises two bent contact zones 316. These bent contact zones 316 comprise, each respectively, on the inner face of the corresponding blade 308, a first 317 and a second 314 contact surfaces.

The lever provided by the second portion 313 thus makes it possible to control the contact force at these first 317 and second 314 contact surfaces.

When a blade 308 is not stressed, the third portion 315 forms, with the direction of insertion, a general angle β of between 5 and 20 degrees, and is for example preferentially 15 degrees. In other words, when the blades 308 are not stressed and they are viewed from their first contact surface 317 to their free end 309, the blades form an acute angle β with the direction of insertion.

Each of the first and second contact surfaces 314, 317 is convex and essentially oriented towards the space of reception of the pin 202 of a male contact 201 between the blades 308. In other words, the curvature of this surface is generally directed towards the central axis C. The first contact surface 317 corresponds to a sacrificial contact zone to which any electrical arc is wanted to be oriented and which can possibly be degraded. In other words, the contact resistance can increase at a point of contact between this first contact surface 317 and the pin 202 of a male contact 201. The second contact surface 314 corresponds to a useful contact zone for which the contact quality is wanted to be preserved. In other words, there is a desire to avoid having the contact resistance increase at a point of contact between this second contact surface 314 and the pin 202 of a male contact 201.

More specifically, each blade 308 is bent towards the central axis C at the join between the second 313 and third 315 portions, to form a useful contact zone (at the second contact surface 314) which approaches the central axis C. Then, each blade 308 has an inclined surface relative to the direction of insertion intended to limit the insertion effort, while leaving sufficient length towards the free end 309 to produce a sacrificial contact zone. In continuing along each blade 308, towards its free end 309, each blade 308 is once again curved, towards the central axis C, over a concave zone 318 which corresponds therefore in cross section to a concave form relative to the reception space. This concave zone 318 extends to the sacrificial contact zone (at the first contact surface 317) which has a curvature which corresponds in cross section to a convex form relative to the reception space. Finally, the sacrificial contact zone is extended towards the free end by a part 319 that is essentially rectilinear seen in cross section.

A second embodiment of a female contact according to the invention is represented in FIG. 7. The latter also comprises a fixing portion and a connection portion, but only the second 313 and third 315 portions of the connection portion 305 are represented. Each blade 308 comprises, as for the preceding embodiment, a first 317 and a second 314 contact surfaces. The first contact surface 317 corresponds to a sacrificial contact zone and the second contact surface 314 corresponds to a useful contact zone.

In this embodiment, each blade 308 is curved away from the central axis C at the join between the second 313 and third 315 portions, in order to have, upon the insertion of the male contact 201 between the blades 308, an inclined surface relative to the direction of insertion intended to limit the insertion effort, while leaving sufficient length towards the free end 309 to produce a sacrificial contact zone. Then, the blade is curved in the opposite direction (over a zone 320 which corresponds therefore in cross section to a concave form relative to the reception space). After this zone 320 having a concave curvature, in the direction of the free end 309 of the blades 308, each blade 308 is continued by a straight portion 321 that is inclined towards the axis of insertion. This straight portion 321 is continued to the sacrificial contact zone (at the first contact surface 317) which has a curvature which corresponds in cross section to a convex form relative to the reception space. Finally, the sacrificial contact zone is extended, in the direction of the free end 309, by a part 322, seen in cross section, that is essentially rectilinear moving away from the central axis. This rectilinear part 322 forms, relative to the direction of insertion, essentially the same angle as the portion following the useful contact zone. This angle is designed to limit the effort of insertion of the pin of the male contact between the blades.

This second embodiment of the female contact is used, in relation to FIGS. 8A to 8D and 9A to 9D, to illustrate an example of connection and disconnection method according to the invention.

FIG. 8A (position equivalent to that of FIG. 9D): a male contact 201 is introduced between the blades 308, into the reception space, at their free end 309. The blades 308 are not yet stressed and only a part of the cap 203 made of electrically insulating material of the male contact 201 penetrates at the third portion 315. The cap 203 has a tapered form and the first contact surface 317 rests on the outer surface (inclined relative to the direction of insertion) of the cap 203.

FIG. 8B (position equivalent to that of FIG. 9C): the pin 202 of the male contact 201 is introduced even more between the blades 308, in the reception space. The blades 308 are stressed and begin to be deformed. The first contact surface 317 rests on the conductive part of the pin 202. The second contact surface 314 is located in line with the cap, but does not rest on it.

FIG. 8C (position equivalent to that of FIG. 9B): the pin 202 of the male contact 201 is introduced even more between the blades 308, in the reception space. The first contact surface 317 rests on the conductive part of the pin 202. The blades 308 are a little more stressed and deformed. The second contact surface 314 is located in line with the cap and rests on the inclined surface thereof.

FIGS. 8D and 9A: the pin 202 of the male contact 201 is introduced between the blades 308, in the reception space. The blades 308 are stressed and deformed to the maximum. The second contact surface 314 rests on the conductive pin 202, while the first contact surface 317 no longer rests thereon. The connection assembly comprising the male contact 201 and the female contact 301 can be passed through by a current. The electrical contact is established between the second contact surface 314 and the conductive part of the pin 202. The second contact surface 314 represents a useful contact surface safeguarded from any electrical arcing, at which the heating cannot exceed, for a given current, a limit that is predetermined by design.

FIG. 9B: on disconnection, the pin 202 of the male contact 201 leaves the reception space but, in this step, even though the second contact surface 314 is no longer in electrical contact with the conductive part of the pin 202, the first contact surface 317 does still rest thereon. The second contact surface 314 is located in line with the cap and rests on the inclined surface thereof. An electrical arc cannot therefore occur because there is sufficient conduction at the first contact surface 317.

FIG. 9C: the pin 202 of the male contact 201 is still in contact with the first contact surface 317. The second contact surface 314 is located in line with the cap and no longer rests on the inclined surface thereof. An electrical arc cannot occur because there is sufficient conduction at the first contact surface 317. There is therefore a respective position of the male contacts 201 and female contacts 301 in which the first contact surface 317 is still in contact with the pin 202, while the second contact surface 314 is no longer in contact with the pin 202 and is located in line with the cap 203. In other words, the length of the cap parallel to the direction of insertion is greater than or equal to the distance between the first 317 and second 314 contact surfaces parallel to this same direction.

FIG. 9D: the first 317 and second 314 contact surfaces are no longer directly in electrical contact with the conductive part of the pin 202. If an electrical arc occurs, it will be established between the first contact surface 317 and the conductive part of the pin 202 since they correspond to the conductive zones closest to one another.

Generally, it can be noted that the production of female contacts 301 by cutting and stamping an electrically conductive material (rather than by turning/bar turning) facilitates the production of more complex forms of blades 308, and in particular the production of multiple contact zones or first and second contact surfaces 314, 317, with a geometry that is accurate and suited to the production of a sacrificial zone, and of another functional contact zone which will not be damaged by the occurrence of electrical arcing.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A connection assembly, comprising:
   a male contact having a pin formed of an electrically conductive material and extending longitudinally along a central axis parallel to a direction of insertion between an end linked mechanically and electrically to a fixing portion and a free end, wherein the pin has a cap composed of a dielectric material at the free end; and
   a female contact having a bushing comprising a plurality of elastic blades, each blade of the plurality of elastic blades extending longitudinally between a base and a free end and linked to the female contact only at the base, the plurality of elastic blades configured to receive the pin of the male contact between them and establish electrical contact with the pin when the male contact is mated to the female contact, wherein each of these blades comprises two bent contact zones to form first and second contact surfaces that are convex and essentially oriented towards the central axis, the first contact surface being situated closer than the second contact surface to the free end of the elastic blade on which they are formed, wherein the first contact surface of each blade is conformed so that the first contact surface rests on the cap upon connection of the male contact and the female contact before establishing electrical contact with an electrically conductive zone of the pin, wherein a length of the cap parallel to the direction of insertion is greater than or equal to a distance between the first and second contact surfaces parallel to this same direction of insertion.

2. The connection assembly according to claim 1, wherein the first and second contact surfaces rest respectively on an outer surface and are inclined relative to the direction of insertion of the cap upon insertion of the male contact between the blades.

3. The connection assembly according to claim 1, wherein the bushing is formed by cutting and stamping a sheet of electrically conductive material.

4. The connection assembly according to claim 1, wherein each of the two bent contact zones is conformed so that there is a respective position of the male contact and the female contact in which the first contact surface is still in contact with the pin while the second contact surface is no longer in contact with the pin and is located in line with the cap upon disconnection of the male contact and of the female contact.

5. The connection assembly according to claim 1, wherein the pin and the cap have essentially a symmetry of revolution about the central axis.

6. The connection assembly according to claim 1, wherein the cap has an essentially tapered form, a height of which is located on the central axis, and two contact surfaces of each blade of the plurality of elastic blades are configured so that the second contact surface rests temporarily on the cap while the first contact surface is still in contact with the pin upon disconnection of the male contact and of the female contact.

7. The connection assembly according to claim 1, wherein the first contact surface of each blade of the plurality of elastic blades is in contact with the pin when the male contact and the female contact are mated.

8. The connection assembly according to claim 1, wherein the first contact surface of each blade of the plurality of elastic blades is not in contact with the pin when the male contact and the female contact are mated.

9. The connection assembly according to claim 1, wherein each blade of the plurality of elastic blades comprises an essentially rectangular section at right angles to a longitudinal direction between the base and its free end.

10. The connection assembly according to claim 1, further comprising a third bent zone, concave relative to a reception space, this third zone situated between first and second bent contact zones.

11. The connection assembly according to claim 1, wherein the blades form a first acute angle with the direction of insertion when the blades are not stressed and they are viewed from their second contact surface to the base.

12. The connection assembly according to claim 11, wherein the blades form a second acute angle with the direction of insertion when the blades are not stressed and they are viewed from their first contact surface to their free end.

13. A method of operating a connection assembly having a male contact having a pin formed of an electrically conductive material and extending longitudinally along a central axis parallel to a direction of insertion between an end linked mechanically and electrically to a fixing portion and a free end, wherein the pin has a cap composed of a dielectric material at the free end and a female contact having a bushing comprising a plurality of elastic blades, each blade of the plurality of elastic blades extending longitudinally between a base and a free end and linked to the female contact only at the base, the plurality of elastic blades configured to receive the pin of the male contact between them and establish electrical contact with the pin when the male contact is mated to the female contact, wherein each of these blades comprises two bent contact zones to form first and second contact surfaces that are convex and essentially oriented towards the central axis, the first contact surface being situated closer than the second contact surface to the free end of the elastic blade on which they are formed, wherein a length of the cap parallel to the direction of insertion is greater than or equal to a distance between the first and second contact surfaces parallel to this same direction of insertion, said method comprising the steps of:

inserting the male contact within the female contact such that the first contact surface rests on the cap upon connection of the male contact and the female contact prior to establishing electrical contact with an electrically conductive zone of the pin.

14. The method according to claim 13, wherein a current greater than or equal to 32 amperes is passed through the male contact and the female contact while the second contact surfaces establish a physical and electrical contact with the pin and the first contact surfaces are not in the physical and electrical contact with the pin.

15. The method according to claim 13, further comprising the step of:

removing the male contact from the female contact, wherein the male contact and the female contact pass through a position in which the first contact surface is still in contact with the pin while the second contact surface is no longer in contact with the pin and is located in line with the cap as the male contact is disconnected from the female contact.

16. The method according to claim 15, wherein at least one first contact surface remains in electrical contact with the pin, while each first contact surface is at a distance from any conductive zone of the pin of at least 1.5 millimeters as the male contact is disconnected from the female contact.

17. A female contact, comprising:

a bushing comprising a plurality of elastic blades each including respectively adjoining first, second and third portions, each blade of the plurality of elastic blades extending longitudinally between a base and a free end and linked to the female contact only at the base, the base has a diameter, the plurality of elastic blades arranged circumferentially about a central axis and configured to receive a male contact having a pin with a cap composed of a dielectric material at its free end between them and establish electrical contact with the pin when the male contact is mated to the female contact, wherein each of these blades comprises two bent contact zones to form first and second contact surfaces that are convex and essentially oriented towards the central axis, the first contact surface being situated closer than the second contact surface to the free end of the elastic blade on which they are formed, wherein the second portion is inclined at an acute angle from the base toward the central axis in a relaxed state, the third portion includes the first and second contact zones, the second portion and the third portion with its first and second contact zones arranged inward of the diameter in the relaxed state, wherein the first contact surface of each blade is conformed so that the first contact surface is configured to rests on the cap upon connection of the male contact and the female contact before establishing electrical contact with an electrically conductive zone of the pin.

18. The female contact according to claim 17, wherein the first and second contact surfaces rest respectively on an outer surface and are inclined relative to the direction of insertion of the cap upon insertion of the male contact between the blades.

19. The female contact according to claim 17, wherein each of the two bent contact zones is conformed so that there is a respective position of the male contact and the female contact in which the first contact surface is still in contact with the pin while the second contact surface is no longer in contact with the pin and is located in line with the cap upon disconnection of the male contact and of the female contact.

\* \* \* \* \*